United States Patent [19] [11] Patent Number: 4,964,270
Taylor et al. [45] Date of Patent: Oct. 23, 1990

[54] GAS TURBINE ENGINE FUEL SYSTEM

[75] Inventors: David H. Taylor, Warwick; Michael R. Lyons, Leicester, both of England

[73] Assignee: Rolls-Royce plc, London, England

[21] Appl. No.: 352,953

[22] Filed: May 17, 1989

[30] Foreign Application Priority Data

May 27, 1988 [GB] United Kingdom ............... 8812588

[51] Int. Cl.⁵ ........................... F02C 7/232; F02C 7/26
[52] U.S. Cl. ............................. 60/39.094; 60/39.141; 60/734
[58] Field of Search ................ 60/39.094, 39.141, 734, 60/739, 39.826

[56] References Cited

U.S. PATENT DOCUMENTS 2,543,366  2/1951  Haworth et al. ............... 60/39.094
2,846,845  8/1958  Parker ........................... 60/39.094
3,344,602  10/1967 Davies et al. .................. 60/39.094
4,897,994  2/1990  Shekleton ...................... 60/39.141

Primary Examiner—Louis J. Casaregola
Attorney, Agent, or Firm—Cushman, Darby & Cushman

[57] ABSTRACT

A gas turbine engine fuel system comprises a main fuel manifold and starter fuel manifold which direct fuel into the combustion apparatus of a gas turbine engine. During normal engine operation, fuel flow to the starter manifold is prevented by a solenoid valve. Air from within the combustion apparatus then flows back through the starter manifold and into a fuel drains system of the engine to purge the starter manifold of fuel. This purging of fuel in the starter manifold engine operation prevents the undesirable leakage of fuel into the combustion apparatus from the starter manifold.

6 Claims, 2 Drawing Sheets

GAS TURBINE ENGINE FUEL SYSTEM

FIELD OF THE INVENTION

This invention relates to a gas turbine engine fuel system and in particular to a fuel system suitable for an industrial or marine gas turbine engine.

BACKGROUND OF THE INVENTION

It is common practice to provide a gas turbine engine with two separate manifolds for the supply of fuel to the combustion apparatus of the engine. One manifold is for the main supply of fuel to the combustion apparatus and the other is for the supply of fuel for the purpose of engine starting. Thus when the engine is started, fuel is supplied to the combustion apparatus through both manifolds until combustion is initiated. Fuel supply through the main manifold is maintained to sustain engine operation, whereupon the fuel flow to the starter manifold is reduced to a very low flow rate.

During normal engine operation, it is normal practice to allow small amounts of fuel to continue to flow through the starter manifold and into the engine combustion apparatus in order provide cooling of the starter manifold. However this can result in an undesirable increase in the smoke produced by the engine. If the fuel flow is stopped, the starter fuel jets supplied with fuel by the starter manifold can become blocked with carbon and localized "hot-spots" can occur within the combustion apparatus.

It is an object of the present invention to provide a gas turbine engine fuel system in which fuel flow through the starter manifold is eliminated during normal engine operation with the substantial elimination of such carbon blockage and localized "hot spots".

According to the present invention, a gas turbine engine fuel system comprises a source of pressurized fuel, main and starter fuel manifolds interconnected with and adapted to receive fuel from a source of pressurized fuel, means interconnecting each of said manifolds with the interior of the combustion apparatus of a gas turbine engine and adapted to direct fuel into said combustion apparatus interior, and valve means adapted to optionally interrupt the fuel supply to said starter fuel manifold, means being provided to interconnect said starter fuel manifold with a drains system which is arranged to be at a pressure lower than that operationally within said combustion chamber, whereby when, during engine operation, said fuel flow to said starter manifold is interrupted by said valve means, pressurized gases originating from within said combustion equipment flow through and thereby purge said starter manifold and said means interconnecting said starter manifold and said combustion apparatus, and exhaust into said drains system through said means interconnecting said starter manifold and said drains system, flow limiting means being provided in said means interconnecting said starter manifold and said drains system to at least limit the amount of fuel flowing into said drains system when said fuel supply to said starter manifold is not interrupted by said valve means.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
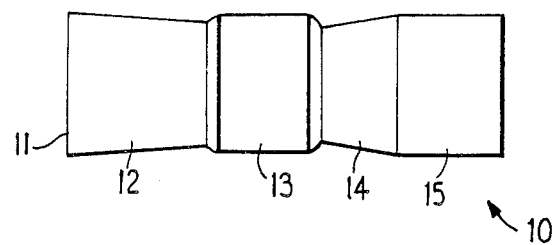
FIG. 1 is a side view of a gas turbine engine having a fuel system in accordance with the present invention.

With reference to FIG. 1 of the drawings, a gas turbine engine generally indicated at 10 is of conventional construction and comprises, in axial flow series, an air inlet 11, an air compressor section 12, combustion equipment 13, a turbine section 14 and an exhaust nozzle 15. The engine 10 functions in the conventional manner whereby air entering the engine 10 through the air inlet 11 is compressed by the compressor section 12 before being directed into the combustion equipment 13 which comprises a plurality of discrete combustion chambers (not shown). There the air is mixed with a suitable fuel and combustion takes place. The resultant exhaust gases then expand through the turbine section, which drives the compressor section, before being exhausted through the exhaust nozzle 15. The exhaust nozzle 15 directs the exhaust gases to a power turbine (not shown) which may be used to drive suitable electrical power generation equipment or alternatively a gearbox connected to, for instance, a ship's propeller system.

Figure 2:
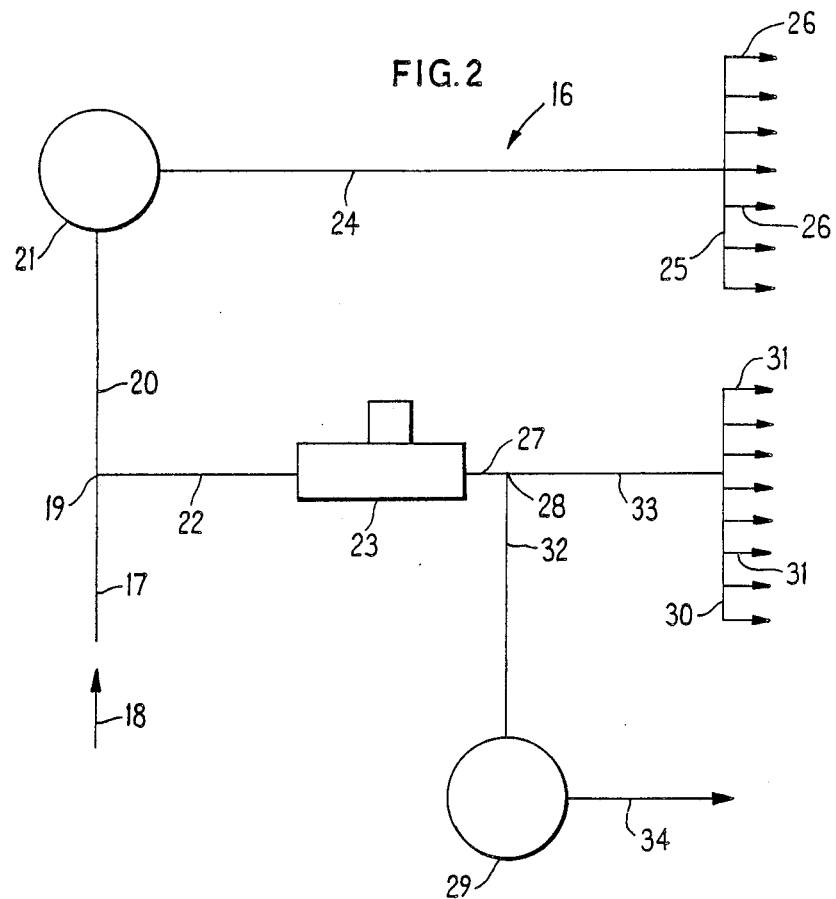
FIG. 2 is a schematic view of a gas turbine engine fuel system in accordance with the present invention.

A portion of the fuel system of the gas turbine engine 10 is shown schematically at 16 in FIG. 2. Fuel, such as diesel oil pressurized by a suitable pump (not shown), flows along a fuel line 17 as indicated by the arrow 18. A T-junction 19 divides the fuel flow with one portion flowing down a fuel line 20 to a pressure increasing valve 21, and the remainder flowing down a further fuel line 22 to a solenoid valve 23.

The pressure increasing valve 21 is of the type which permits a fuel flow therethrough as the fuel pressure in the line 20 increases above a predetermined value. Fuel which has flowed through the pressure increasing valve 21 passes into a fuel line 24 which directs the fuel to a main fuel manifold 25. A number of burners shown schematically at 26 then direct the fuel from the main manifold 25 into the interior of the combustion chambers of the combustion equipment 13; one burner 26 directing fuel into one combustion chamber.

The burners 26 constitute the main source of fuel for the combustion equipment and are intended to operate over the whole operating range of the gas turbine engine 10.

The solenoid valve 23 is closed during the normal operation of the gas turbine engine 10 so that all fuel flows along the lines 17, 20 and 24 into the main fuel manifold 25. However during the starting of the gas turbine engine 10, the solenoid valve 23 is opened so that fuel flows along the fuel line 22 and through the solenoid valve 23 and into a further fuel line 27. A T-junction 28 divides the fuel flow from the fuel line 27 with one portion flowing to a further solenoid valve 29 through a fuel line 32 and the remainder flowing to a starter manifold 30 through a fuel line 33. At all times when the solenoid valve 23 is open, the solenoid valve 29 is closed so that effectively all fuel passing through the solenoid valve 23 is directed to the starter manifold 30. A number of jets shown schematically at 31 then direct the fuel from the starter manifold 30 into the combustion chambers of the combustion equipment 13; one jet 31 directing fuel into one combustion chamber.

When the gas turbine engine 10 is started, the solenoid valve 23 is arranged to be open so that fuel flows to both of the main and starter manifolds 25 and 30 respectively and thence to the engine combustion equipment 13. The pressure of the fuel is chosen such that the pressure increasing valve 21 apportions the fuel between the main and starter manifolds in such a manner that sufficient fuel is supplied to the appropriate region of the combustion equipment 13 for the initiation of combustion therein. As soon as combustion has been initiated and sustained, the solenoid valve 23 is closed so that all fuel from then on passes through the fuel lines 20 and 24 to the main manifold 25 and the burners 26.

In order to purge the fuel lines 32 and 33 downstream of the solenoid valve 23 of fuel, the solenoid valve 29 is opened as the solenoid valve 23 is closed. The solenoid valve 29 interconnects the fuel line 32 with a line 34 leading to a fuel drains system (not shown). The starter fuel jets 31 are so located in the combustion equipment 13 that they are in a region of high pressure, non-fuel containing air. This being so, the opening of the solenoid valve 29 places that high pressure air in direct flow communication with a low pressure region (the fuel drains system) so that the high pressure air flows through the starter fuel jets 31, and the lines 32,33 and 34 and into the fuel drains system.

This flow of high pressure air from the combustion equipment 13 serves two functions: it purges the lines 32 and 33 and the starter manifold 30 and jets 31 of fuel and ensures that any fuel which leaks past the solenoid valve 23 flows into the fuel drains system, not into the combustion equipment 13.

Although the air used to purge the fuel lines 32,33 and 34 is derived from a high temperature source (the combustion equipment 13) the fact that it passes through the jets 31 where it is subject to a pressure drop and expansion ensures that its temperature has been reduced by the time it passes through the lines 32,33 and 34 and the solenoid 29.

Figure 3:
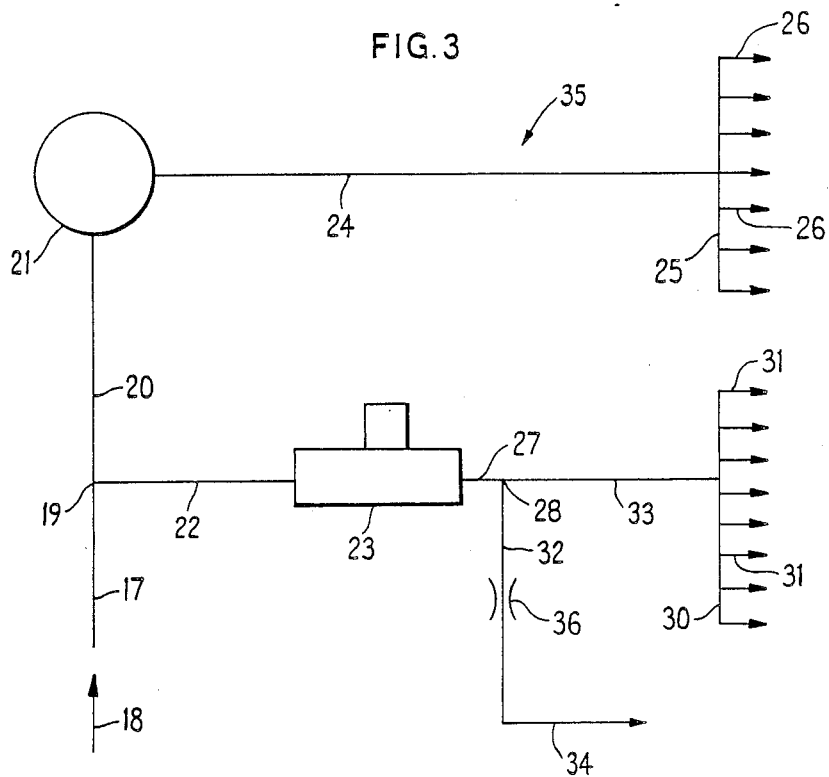
FIG. 3 is a schematic view of an alternative gas turbine engine fuel system in accordance with the present invention.

The embodiment of the fuel system in accordance with the present invention generally indicated at 35 in FIG. 3 has portions which are common with the embodiment of FIG. 2 and, for the sake of convenience, those portions have common reference numbers.

The fuel system 35 is distinguished from the fuel system 16 shown in FIG. 1 by the replacement of the solenoid 29 in fuel system 16 by a flow restrictor 36. This modification ensures that when the remaining solenoid 23 is open during gas turbine engine 10 starting, a small amount of fuel passes through the restrictor 36 and into the fuel drains system and is therefore wasted. However in practice the solenoid 23 is only open for a short time so that the amount of fuel lost is insignificant.

When the solenoid 23 is closed during normal engine operation, the restrictor 36 is arranged to be sufficiently large as to permit an adequate purging air flow through the lines 32,33 and 34 and the starter manifold 30 and jets 31.

The advantage of utilizing a flow restrictor 36 in place of the solenoid valve lies in the reduction in complexity in the system and a increase in its reliability.

We claim:

1. A gas turbine engine fuel system comprising a source of pressurized fuel, main and starter fuel manifolds interconnected with and adapted to receive fuel from said source of pressurized fuel, means interconnecting each of said manifolds with the interior of the combustion apparatus of a gas turbine engine and adapted to direct fuel into said combustion apparatus interior, valve means adapted to optionally interrupt the fuel supply to said starter fuel manifold, and a drains system means being provided to interconnect said starter fuel manifold with a drains system, said drains system being arranged to be at a pressure lower than that operationally within said combustion chamber, whereby when, during engine operation, said fuel flow to said starter manifold is interrupted by said valve means, pressurized gases originating from within said combustion equipment flow through and thereby purge said starter manifold and said means interconnecting said starter manifold and said combustion apparatus, and exhaust into said drains system through said means interconnecting said starter manifold and said drains system, flow limiting means being provided in said means interconnecting said starter manifold and said drains system to at least limit the amount of fuel flowing into said drains system when said fuel supply to said starter manifold is not interrupted by said valve means.

2. A gas turbine engine fuel system as claimed in claim 1 wherein said valve means comprises a solenoid valve.

3. A gas turbine engine fuel system as claimed in claim 1 wherein said flow limiting means is adapted to prevent the flow of fuel through said means interconnecting said starter manifold and said drains system when said fuel supply to said starter manifold is uninterrupted by said valve means.

4. A gas turbine engine fuel system as claimed in claim 3 wherein said flow limiting means comprises a solenoid valve.

5. A gas turbine engine fuel system as claimed in claim 1 wherein said flow limiting means comprises a fluid flow restrictor.

6. A gas turbine engine fuel system as claimed in claim 1 wherein said pressurized gases originating from within said combustion equipment are at least predominantly air.

* * * * *